United States Patent

Onodera et al.

[11] Patent Number: 6,042,865
[45] Date of Patent: Mar. 28, 2000

[54] FOOD FOAMING AGENT COMPOSITION

[75] Inventors: Hiroshi Onodera, Ohsaka; Kumi Horikawa, Yawata; Noriko Ikawa, Hirakata, all of Japan

[73] Assignee: Riken Vitamin Co., Ltd., Tokyo, Japan

[21] Appl. No.: 08/877,575

[22] Filed: Jun. 17, 1997

[30] Foreign Application Priority Data

Jun. 24, 1996 [JP] Japan .................................. 8-182743

[51] Int. Cl.[7] .............................. A23D 5/02; A21D 2/16
[52] U.S. Cl. ...................... 426/549; 426/552; 426/553; 426/554; 426/556; 426/654; 426/564
[58] Field of Search ..................................... 426/804, 613, 426/654, 549, 550, 551, 552, 556, 553, 554, 564

[56] References Cited

U.S. PATENT DOCUMENTS

| | | | |
|---|---|---|---|
| 3,479,189 | 11/1969 | Vrang et al. ............................ | 99/118 |
| 3,637,523 | 1/1972 | Harwood ................................ | 252/356 |
| 3,876,805 | 4/1975 | Craig et al. ............................ | 426/23 |
| 4,159,952 | 7/1979 | Jackson ................................. | 252/356 |
| 4,199,608 | 4/1980 | Gilmore et al. ....................... | 426/804 |
| 4,351,852 | 9/1982 | Rule et al. ............................. | 426/804 |
| 4,491,596 | 1/1985 | Elias ....................................... | 426/5 |
| 4,644,932 | 2/1987 | Yamaguchi et al. .................. | 426/653 |
| 4,826,699 | 5/1989 | Soe ......................................... | 426/564 |
| 4,869,920 | 9/1989 | Kawana et al. ....................... | 426/643 |
| 5,160,759 | 11/1992 | Nomura et al. ....................... | 426/602 |
| 5,755,890 | 5/1998 | Yuan ...................................... | 127/71 |

*Primary Examiner*—Cynthia L. Nessler
*Attorney, Agent, or Firm*—Roylance, Abrams, Berdo & Goodman, L.L.P.

[57] ABSTRACT

The present invention relates to a food foaming agent composition which imparts good taste and good texture in the mouth to the food product and imparts good foaming property and good foaming stability. This food foaming agent composition is characterized in that (1) the taste of the product is not deteriorated regardless of excellent foaming property and excellent foaming stability because it contains a glycerin fatty acid ester as an emulsifier but does not contain a sorbitan fatty acid ester, a propylene glycol fatty acid ester and a sucrose fatty acid ester. More specifically, the food foaming agent composition is characterized in that (2) a glycerin saturated fatty acid monoester and a polyglycerin saturated fatty acid ester are used as the glycerin fatty acid ester in a weight ratio within the range from 1:0.5 to 1:4; (3) it contains 5 to 50% by weight of a glycerin saturated fatty acid monoester of a saturated fatty acid having 20 or more carbon atoms as the glycerin monosaturated fatty acid ester; or (4) not less than 50% by weight of the polyglycerin saturated fatty acid ester is a diglycerin monosaturated fatty acid ester.

10 Claims, No Drawings

FOOD FOAMING AGENT COMPOSITION

BACKGROUND OF THE INVENTION

1. Field of the invention

The present invention relates to a foaming agent composition capable of obtaining food products, which are superior in foam stability, foaming property and tast and texture in the mouth. More particularly, it relates to a foaming agent composition for cakes such as sponge cake, butter cake and the like. More particularly, it relates to a foaming agent composition for food such as cake, comprising a glycerin saturated fatty acid monoester and a diglycerin saturated fatty acid monoester as an essential ingredient.

2. Description of the prior art

Examples of an improving agent using in the preparation of cakes include foaming shortening, foaming emulsifying fats and oils, paste type foaming agent, powder type foaming agent and the like. All of these foaming agent contain an emulsifier and the foaming shortening mainly utilizes the foaming property of a propylene glycol fatty acid ester, and the foaming property of the foaming emulsifying fats and oils, the foaming agent and the powdered foaming agent originate from an α crystal of a monoglyceride.

However, since the α crystal of the monoglyceride is thermodynamically unstable, the foaming property is lowered in order as the α crystal transfers to β' crystal and a β crystal in order, and the foaming property is declined as transforming of the crystal foam. So, how how to maintain the α crystal becomes an important object of the food foaming agent.

A pasty foaming agent prepared by stabilizing an α crystal of a monoglyceride in sorbitol using in combination with other food emulsifiers such as sorbitan fatty acid ester, acetylated monoglyceride, sucrose fatty acid ester, propylene glycol fatty acid ester, etc. is present in the market, but there are a lot of problems in this type of foaming agent about the stability, oil resistance, diversity of foaming property due to the temperature of egg and the like. In addition, it is required to develop a foaming agent using no sorbitan fatty acid ester or sucrose fatty acid ester in view of the flavor, but a satisfactory foaming agent is not obtained yet.

Japanese Patent Publication No. Sho-40-24504 discloses a foaming agent composition for cake, comprising 5 to 30 parts by weight of a glycerin fatty acid ester, 5 to 15 parts by weight of a sorbitan fatty acid ester, 5 to 20 parts by weight of a sucrose fatty acid ester and the like. This technique is superior in foaming property and stability of the dough, but has a defect such as poor taste and poor texture in the mouth of the cake.

Japanese Laid-open Patent Publication No. Hei-5-33688 discloses a foaming agent composition for cake preparation, comprising (a) 5 to 15 parts by weight of a glycerin fatty acid monoester, (b) 0 to 15 parts by weight of a propylene glycol fatty acid ester and/or a sorbitan fatty acid ester, (c) 1 to 6 parts by weight of a sucrose fatty acid ester and/or a polyglycerin fatty acid ester and the like. This technique is also superior in foaming property and stability of the dough, but has a defect such as poor taste and poor texture in the mouth of the cake product.

SUMMARY OF THE INVENTION

Under these circumstances, the present inventors have intensively studied so as to solve the above problems. As a result, it has been found that the taste of cake product is desirable when the foaming agent composition contains a glycerin fatty acid ester and polyglycerin fatty acid ester as an emulsifier but does not contains a sorbitan fatty acid ester, a propylene glycol fatty acid ester and a sucrose fatty acid ester. It has also been found that a food foaming agent composition having good foaming property and good foaming stability can be obtained by (1) using the glycerin saturated fatty acid monoester and the polyglycerin saturated fatty acid ester in a weight ratio within the range from 1:0.5 to 1:4, (2) containing 5 to 50% by weight of a glycerin saturated fatty acid monoester of a saturated fatty acid having 20 or more carbon atoms as the glycerin saturated fatty acid monoester or the fact that (3) not less than 50% by weight of the polyglycerin saturated fatty acid ester is a diglycerin saturated fatty acid monoester.

That is, the above object of the present invention can be accomplished by the followings:

(1) A food foaming agent composition which contains a glycerin fatty acid ester and polyglycerin fatty acid ester as an emulsifier and does not contain a sorbitan fatty acid ester, a propylene glycol fatty acid ester and a sucrose fatty acid ester;

(2) The food foaming agent composition according to claim 1, which contains a glycerin saturated fatty acid monoester as the glycerin fatty acid ester and a polyglycerin saturated fatty acid ester;

(3) The food foaming agent composition according to claim 1 or 2, wherein a weight ratio of the glycerin saturated fatty acid monoester to the polyglycerin saturated fatty acid ester is from 1:0.5 to 1:4;

(4) The food foaming agent composition according to any one of claims 1 to 3, wherein not less than 50% by weight of the polyglycerin saturated fatty acid ester is a diglycerin saturated fatty acid monoester; and (5) The food foaming agent composition according to any one of claims 1 to 4, which contains 5 to 50% by weight of a glycerin saturated fatty acid monoester of a saturated fatty acid having 20 or more carbon atoms as the glycerin saturated fatty acid monoester.

As is apparent from the above, an object of the present invention is to provide a food foaming agent composition which imparts good taste and good texture in the mouth to the product and imparts good foaming property and foaming stability.

DETAILED DESCRIPTION OF THE PREFERRED EMBODIMENT

It is essential that the emulsifier used in the present invention does not contain a sorbitan fatty acid ester, a propylene glycol fatty acid ester and a sucrose fatty acid ester and contains a glycerin saturated fatty acid monoester and a polyglycerin saturated fatty acid ester. It is also possible to use a glycerin fatty acid ester, a glycerin fatty acid organic acid ester and lecithin as the other emulsifier. As the glycerin saturated fatty acid monoester used in the present invention, there can be used a glycerin saturated fatty acid monoester wherein the monoester purity of a glycerin fatty acid ester, obtained by an ester interchange reaction or esterification reaction between glycerin, edible vegetable fats and oils, food animal fats and oils, food processes fats and oils and fatty acid derived from these food fats and oils, was concentrated to not less than 90% by weight according to methods such as molecular distillation method, solvent fractionation method and the like.

As the constituent fatty acid of the glycerin saturated fatty acid monoester and polyglycerin saturated fatty acid ester used in the present invention, a mixture of saturated fatty acids contained in food fats and oils, that is, saturated fatty acids having carbon atoms of 12, 14, 16, 18, 20, 22, etc. can be generally used. It is preferred that not less than 80% by weight of the saturated fatty acid having 16 or more carbon atoms is used and also preferred that the constituent fatty acid of the glycerin saturated fatty acid monoester contains 5 to 50% by weight of the saturated fatty acid having 20 or more carbon atoms so as to effectively solve the problem of the present invention.

When the content of the saturated fatty acid having 16 or more carbon atoms as the constituent fatty acid of the glycerin saturated fatty acid monoester and polyglycerin fatty acid ester is less than 80% by weight, sufficient foaming property can not be obtained, and it is not preferred. When the content of the saturated fatty acid having 20 or more carbon atoms as the constituent fatty acid of the glycerin saturated fatty acid monoester is less than 5% by weight, the foaming stability is deteriorated. On the other hand, when the content of the saturated fatty acid having 20 or more carbon atoms is more than 50% by weight, if foods containing the foaming agent composition of the present invention is baked, the hardness of the dough after baking is increased and, therefore, both cases are not preferred.

It is preferred that a blending ratio of the glycerin saturated fatty acid monoester to the polyglycerin saturated fatty acid ester used in the present invention is within the range from 1:0.5 to 1:4 in weight ratio. When the blending ratio of the glycerin monosaturated fatty acid ester is higher than this range, the stability of the a crystalline gel of the glycerin saturated fatty acid monoester is deteriorated, which results in deterioration of the foaming property and deterioration of the storage stability. Therefore, it is not preferred. On the other hand, when the blending ratio of the glycerin saturated fatty acid monoester is lower than this range, sufficient foaming property is not obtained. Therefore, it is not preferred.

As the polyglycerin saturated-fatty acid ester used in the present invention, it is possible to use a product obtained by esterifying polyglycerin, prepared by polymerizing 2 to 10 molar length of glycerins, with several saturated fatty acids. It is preferred that not less than 50% by weight of the diglycerin saturated fatty acid monoester, wherein one molecule of a saturated fatty acid is ester-linked to one molecule of diglycerin obtained by polymerizing two glycerins, is contained in the polyglycerin saturated fatty acid ester. When the content of the diglycerin saturated fatty acid monoester in the polyglycerin saturated fatty acid ester is less than 50% by weight, sufficient foaming property can not be obtained. In addition, when the foaming agent is stored for a long period of time, the foaming property is deteriorated with time. Therefore, it is not preferred.

The food foaming agent composition of the present invention contains water in addition to the ingredient other than the emulsifier, and it is also possible to use saccharides such as invert sugar, sucrose, oligosaccharide, starch sugar, etc. and polyhydric alcohol such as sorbitol, maltol, glycerin, etc. for the purpose of stabilizing the α crystal of the glycerin saturated fatty acid monoester. The food foaming agent composition of the present invention can be produced, for example, in the following manner. A glycerin fatty acid ester, a polyglycerin fatty acid ester and other emulsifiers are molten with heating at 90 to 100° C., followed by uniform dispersion with mixing. An aqueous solution prepared by mixing water, sorbitol and glycerin with heating in the same manner is slowly added to the emulsifier stored with stirring to form a pasty uniform α-crystalline gel. The food foaming agent composition of the present invention can be obtained by transferring this gel with maintaining at 90 to 100° C., followed by cooling with allowing to stand. However, the method of producing the food foaming agent composition of the present invention is not limited to this production method.

An amount of the food foaming agent composition of the present invention added to foods such as cake, etc. varies depending on the kind of foods, but is normally from 0.5 to 15 parts by weight, preferably from 1 to 7 parts by weight, based on 100 parts by weight of foods.

The food foaming agent composition of the present invention can imparts excellent foaming property and excellent foaming stability without exerting a bad influence on the flavor in case of producing cakes, by containing no sorbitan fatty acid ester, propylene glycol fatty acid ester and sucrose fatty acid ester as an emulsifier and specifying each ingredient and a blending ratio of a glycerin saturated fatty acid monoester and a polyglycerin saturated fatty acid ester.

The following Examples and Application Example further illustrate the present invention in detail but are not to be construed to limit the scope thereof. In the Examples and Application Example, all "percents" and "parts" are by weight unless otherwise stated.

EXAMPLES 1 TO 4

According to the formulation shown in Table 1, a food foaming agent composition was prepared by the above-described production method.

The details of the emulsifiers in Table 1 and Table 2 will be shown below.

(A) EMULSY MS, manufactured by Riken Vitamin Co., Ltd. Constituent fatty acid: fatty acid having 16 or more carbon atoms (100%) fatty acid having 20 or more carbon atoms (0%)

(B) POEM B-100, manufactured by Riken Vitamin Co., Ltd. Constituent fatty acid: fatty acid having 16 or more carbon atoms (100%) fatty acid having 20 or more carbon atoms (85%)

(C) POEM C-100, manufactured by Riken Vitamin Co., Ltd. Constituent fatty acid: fatty acid having 16 or more carbon atoms (20%) fatty acid having 20 or more carbon atoms (0%)

(D) POEM DS-100A, manufactured by Riken Vitamin Co., Ltd. Diglycerin saturated fatty acid monoester (85%)

(E) POEM J-0081, manufactured by Riken Vitamin Co., Ltd. Diglycerin saturated fatty acid monoester (0%)

COMPARATIVE EXAMPLES 1 TO 6

According to the formulation shown in Table 2 and 3, a food foaming agent composition was prepared by the above-described production method.

APPLICATION EXAMPLE

Using the food foaming agent compositions of Examples 1 to 4 and Comparative Examples 1 to 6 thus obtained in the above manner, a sponge cake was produced according to the following formulation and production conditions and then evaluated.

| Formulation of sponge cake | |
| --- | --- |
| Wheat flour (soft) | 100 parts |
| First-class sugar | 120 parts |
| Whole egg | 150 parts |
| Baking powder | 2 parts |
| Salad oil | 15 parts |
| Water | 25 parts |
| Food foaming agent composition | 3 parts |

A cake batter was prepared by premixing the above ingredients using a vertical mixer according to the all-in-mix method, followed by mixing using a continuous mixer so that the specific gravity of the batter becomes 0.56–0.54. The resulting cake batter (360 g) was put in a No. 6 round mold, and then baked in an oven at 180° C. for 30 minutes. The evaluation of the resulting sponge cake and that of the foaming agent composition were conducted with respect to the following evaluation items.

Evaluation items

Stability of cake batter: A cake batter was taken in a test tube, and a state of the batter stored in a constant temperature incubator at 60° C. for 2 hours was visually confirmed.

○ Good, Δ Slightly separated, × Considerably separated

Taste and texture in the mouth of cake: They were evaluated by an organoleptic test. ⊚ Good, ○ Slightly good, Δ Slightly poor, × Poor Foaming property: An amount of the foaming agent composition in the above formulation of the sponge cake was changed to 5 parts. The ingredients were premixed at low rate for 1 minute by using a vertical mixer according to the all-in-mix method, followed by stirring at high rate for 2 minutes. Then, the specific gravity of the cake batter was measured.

The results are shown in Table 4.

As is apparent from the above results, according to the food foaming agent composition of the present invention, excellent foaming property and excellent foaming stability can be imparted without exerting a bad influence on the taste in case of producing cakes, by containing no sorbitan fatty acid ester, propylene glycol fatty acid ester and sucrose fatty acid ester as an emulsifier and specifying each ingredient and a blending ratio of a glycerin saturated fatty acid monoester and a polyglycerin saturated fatty acid ester.

The food foaming agent composition of the present invention, whereby excellent foaming property and excellent foaming stability can be imparted without exerting a bad influence on the flavor in case of producing cakes, by containing no sorbitan fatty acid ester, propylene glycol fatty acid ester and sucrose fatty acid ester as an emulsifier and specifying each ingredient and a blending ratio of a glycerin saturated fatty acid monoester and a polyglycerin saturated fatty acid ester.

TABLE 1

Formulation of the food foaming agent composition

| | (Numerals represent % by weight) Example | | | |
| --- | --- | --- | --- | --- |
| Raw material | 1 | 2 | 3 | 4 |
| Glycerin saturated fatty acid monoester (A) | 13.5 | 7.5 | 13.5 | 9.0 |
| Glycerin saturated fatty acid monoester (B) | 1.5 | 7.5 | 1.5 | 1.0 |

TABLE 1-continued

Formulation of the food foaming agent composition

| | (Numerals represent % by weight) Example | | | |
| --- | --- | --- | --- | --- |
| Raw material | 1 | 2 | 3 | 4 |
| Polyglycerin saturated fatty acid ester (D) | 10.0 | 10.0 | 6.0 | 15.0 |
| Polyglycerin saturated fatty acid ester (E) | | | 4.0 | |
| Water | 35.0 | 35.0 | 35.0 | 35.0 |
| 70% Sorbitol | 30.0 | 30.0 | 30.0 | 30.0 |
| Glycerin | 10.0 | 10.0 | 10.0 | 10.0 |
| Glycerin saturated fatty acid monoester Construent fatty acid: | | | | |
| Number of carbon atoms: | | | | |
| 16 or more | 100.0 | 100.0 | 100.0 | 100.0 |
| 20 or more | 8.5 | 42.5 | 8.5 | 8.5 |
| Content of diglycerin saturated fatty acid monoester in polyglyserin saturated fatty acid ester | 85.0 | 85.0 | 51.0 | 85.0 |
| Blending (weight) ratio between glycerin saturated fatty acid monoester and polyglycerin saturated fatty acid ester | 1:0.667 | 1:0.667 | 1:0.667 | 1:1.500 |

TABLE 2

Formulation of the food foaming agent composition

| | (Numerals represent % by weight) Comparative Example | | | |
| --- | --- | --- | --- | --- |
| Raw material | 1 | 2 | 3 | 4 |
| Glycerin saturated fatty acid monoester (A) | 15.0 | | | |
| Glycerin saturated fatty acid monoester (B) | | 15.0 | | 3.0 |
| Glycerin saturated fatty acid monoester (C) | | | 15.0 | 12.0 |
| Polyglycerin saturated fatty acid ester (D) | 10.0 | 10.0 | 10.0 | 10.0 |
| Polyglycerin saturated fatty acid ester (E) | | | | |
| Water | 35.0 | 35.0 | 35.0 | 35.0 |
| 70% Sorbitol | 30.0 | 30.0 | 30.0 | 30.0 |
| Glycerin | 10.0 | 10.0 | 10.0 | 10.0 |
| Glycerin saturated fatty acid monoester Construent fatty acid: | | | | |
| Number of carbon atoms: | | | | |
| 16 or more | 100.0 | 100.0 | 20.0 | 36.0 |
| 20 or more | 0.0 | 85.0 | 0.0 | 17.0 |
| Content of diglycerin saturated fatty acid monoester in polyglycerin saturated fatty acid ester | 85.0 | 85.0 | 85.0 | 85.0 |
| Blending (weight) ratio between glycerin saturated fatty acid monoester and polyglycerin saturated fatty acid ester | 1:0.667 | 1:0.667 | 1:0.667 | 1:0.667 |

TABLE 3

Formulation of the food foaming agent composition (Numerals represent % by weight)

| Raw material | Comparative Example 5 | Comparative Example 6 |
|---|---|---|
| Glycerin saturated fatty acid monoester (A) | 12.0 | 16.2 |
| Glycerin saturated fatty acid monoester (B) | 3.0 | 1.8 |
| Glycerin saturated fatty acid monoester (C) | | |
| Polyglycerin saturated fatty acid ester (D) | | 7.0 |
| Polyglycerin saturated fatty acid ester (E) | 10.0 | |
| Water | 35.0 | 35.0 |
| 70% Sorbitol | 30.0 | 30.0 |
| Glycerin | 10.0 | 10.0 |
| Glycerin saturated fatty acid monoester Construent fatty acid: | | |
| Number of carbon atoms: | | |
| 16 or more | 100.0 | 100.0 |
| 20 or more | 17.0 | 8.5 |
| Content of diglycerin saturated fatty acid monoester in polyglycerin saturated fatty acid ester | 0.0 | 85.0 |
| Blending (weight) ratio between glycerin saturated fatty acid monoester and polyglycerin saturated fatty acid ester | 1:0.667 | 1:0.389 |

TABLE 4

| | Stability of batter | Taste of cake | Texture of cake | Foaming property |
|---|---|---|---|---|
| Example 1 | ○ | ⊚ | ⊚ | 0.44 |
| Example 2 | ○ | ⊚ | ⊚ | 0.45 |
| Example 3 | ○ | ⊚ | ○ | 0.45 |
| Example 4 | ○ | ⊚ | ○ | 0.51 |
| Comparative Example 1 | Δ | ⊚ | ○ | 0.48 |
| Comparative Example 2 | ○ | ⊚ | × | 0.51 |
| Comparative Example 3 | × | ○ | × | 0.70 |
| Comparative Example 4 | Δ | ○ | × | 0.64 |
| Comparative Example 5 | Δ | ⊚ | × | 0.67 |
| Comparative Example 6 | Δ | ⊚ | × | 0.73 |

What is claimed is:

1. A method of foaming a cake batter comprising the steps of
combining about 0.5 to 15 parts by weight of a food foaming agent composition to about 100 parts by weight of a cake batter to form a mixture, and
mixing the mixture to form a foamed mixture,
wherein said food foaming agent composition comprises an emulsifier including a glycerin fatty acid ester component and a polyglycerin fatty acid ester component in a weight ratio of 1:0.5 to 1:4, said glycerin fatty acid ester component comprising at least 80% by weight of a glycerin ester of a saturated fatty acid of 16 or more carbon atoms and about 5–50% by weight of a glycerin ester of a saturated fatty acid having 20 or more carbon atoms, wherein said emulsifier does not contain a sorbitan fatty acid ester, a propylene glycol fatty acid ester or a sucrose fatty acid ester.

2. The method of claim 1, wherein said food foaming agent composition further includes a saccharide selected form the group consisting of an invert sugar, sucrose, oligosaccharide, and mixtures thereof, and a polyol selected from the group consisting of sorbitol, maltol, glycerin, and mixtures thereof.

3. A foamable cake batter composition comprising:
a cake batter, and about 0.5 to 15 parts by weight of a food foaming agent composition based on 100 parts by weight of said cake batter, wherein said food foaming agent composition comprises an emulsifier, said emulsifier including a glycerin fatty acid ester component and a polyglycerin fatty acid ester component in a weight ratio of about 1:0.5 to about 1:4, said glycerin fatty acid ester component comprising at least 80% by weight of a glycerin ester of a saturated fatty acid of 16 or more carbon atoms and about 5–50% by weight of a glycerin ester of a saturated fatty acid having 20 or more carbon atoms and having a monoester content of at least 90% by weight, wherein said emulsifier does not contain a sorbitan fatty acid ester, a propylene glycol fatty acid ester or a sucrose fatty acid ester.

4. The foamable cake batter composition of claim 3, wherein said food foaming agent composition is an aqueous composition.

5. A cake batter foaming agent composition comprising an emulsifier, said emulsifier including a glycerin saturated fatty acid monoester component and a polyglycerin saturated fatty acid ester component in a weight ratio of 1:0.5 to 1:4, said saturated glycerin fatty acid ester component comprising at least 80% by weight of a glycerin ester of a saturated fatty acid having 16 or more carbon atoms and about 5% to 50% by weight of a glycerin ester of a fatty acid having 20 or more carbon atoms and having a monoester content of at least 90%, said polyglycerin saturated fatty acid ester component comprising at least 50% by weight of a diglycerin fatty acid monoester, wherein said emulsifier does not contain a sorbitan fatty acid ester, a propylene glycol fatty acid ester or a sucrose fatty acid ester.

6. The cake batter foaming composition of claim 5, wherein said polyglycerin fatty acid ester component comprises a fatty acid ester of a polyglycerin having 2 to 10 glycerin units.

7. The cake batter foaming composition of claim 5, further comprising a polyol selected from the group consisting of sorbitol, maltol, glycerin and mixtures thereof.

8. The cake batter foaming agent composition of claim 5, wherein said composition is an aqueous solution containing sufficient water to form a gel.

9. The cake batter foaming composition of claim 5, further comprising a saccharide.

10. The cake batter foaming composition of claim 9, wherein said saccharide is selected from the group consisting of an invert sugar, sucrose, oligosaccharide, and mixtures thereof.

* * * * *